US012793912B2

(12) United States Patent
Chiang et al.

(10) Patent No.: US 12,793,912 B2
(45) Date of Patent: Nov. 10, 2026

(54) KEYBOARD WITH BUFFER AND NOISE REDUCTION STRUCTURE

(71) Applicant: SOLID YEAR CO., LTD., New Taipei City (TW)

(72) Inventors: Li-Yang Chiang, New Taipei City (TW); Chi-Feng Liu, New Taipei City (TW)

(73) Assignee: SOLID YEAR CO., LTD., New Taipei City (TW)

( * ) Notice: Subject to any disclaimer, the term of this patent is extended or adjusted under 35 U.S.C. 154(b) by 259 days.

(21) Appl. No.: 18/804,585

(22) Filed: Aug. 14, 2024

(65) Prior Publication Data

US 2025/0062085 A1 Feb. 20, 2025

Related U.S. Application Data

(60) Provisional application No. 63/532,469, filed on Aug. 14, 2023.

(51) Int. Cl.

| | |
|---|---|
| ***H01H 13/70*** | (2006.01) |
| ***H01H 13/10*** | (2006.01) |
| ***H01H 13/14*** | (2006.01) |
| ***H01H 13/702*** | (2006.01) |
| ***H01H 13/84*** | (2006.01) |
| ***H01H 13/86*** | (2006.01) |

(52) U.S. Cl.

CPC ............ *H01H 13/70* (2013.01); *H01H 13/10* (2013.01); *H01H 13/14* (2013.01); *H01H 13/702* (2013.01); *H01H 13/84* (2013.01); *H01H 13/86* (2013.01)

(58) Field of Classification Search

CPC ........ H01H 13/70; H01H 13/10; H01H 13/14; H01H 13/702; H01H 13/84; H01H 13/86; H01H 2221/062; H01H 3/12; H01H 3/125; H01H 13/7065

See application file for complete search history.

(56) References Cited

U.S. PATENT DOCUMENTS

2025/0062087 A1* 2/2025 Chiang .................. H01H 13/10
2025/0062089 A1* 2/2025 Chiang .................. H01H 13/10

FOREIGN PATENT DOCUMENTS

TW M476305 U 4/2014
TW I669734 B 8/2019

* cited by examiner

*Primary Examiner* — Lheiren Mae A Caroc

(74) *Attorney, Agent, or Firm* — Birch, Stewart, Kolasch & Birch, LLP

(57) ABSTRACT

A keyboard includes a key frame, a support frame, a circuit board, a buffer and noise reduction pad, and a plurality of keys. The key frame and the support frame are assembled with each other. The circuit board is mounted to the bottom surface of the support frame. The buffer and noise reduction pad is abutted against the bottom surface of the circuit board. The keys are inserted through the key frame and the support frame. As such, when the key is pressed, the vibrations and noise generated by the key are counteracted and absorbed by the buffer and noise reduction pad, thereby reducing the intensity of the vibrations and noise and achieving buffer and noise reduction effects.

14 Claims, 10 Drawing Sheets

KEYBOARD WITH BUFFER AND NOISE REDUCTION STRUCTURE

BACKGROUND OF THE INVENTION

1. Field of the Invention

The present invention relates to keyboards and more particularly, to a keyboard that has a buffer and noise reduction structure. The vibration generated by typing on the keyboard and the noise caused by the vibration can be counteracted and absorbed by a buffer and noise reduction pad, making the keyboard quieter during use.

2. Description of the Related Art

Keyboards can be categorized into mechanical, membrane, and capacitive types, mainly distinguished by the switch mechanism and signal transmission method. When a user presses a key on the keyboard, the keycap impacts the frame arranged around the switch to produce noise. The noise level varies depending on the type of the switch. In an office setting, if everyone frequently uses the keyboards, the cumulative typing sounds may create significant noise, affecting concentration of employees.

TW M476305 discloses a keyboard structure containing a gasket, which places a flexible gasket between the iron plate and the keycap. By leveraging the shock-absorbing characteristics of the flexible gasket, the keycap does not directly strike the mechanical key body and the iron plate when pressed, thereby achieving shock absorption and noise reduction functions. Additionally, TW 1669734 provides a key structure with a cushioning layer, which is placed on the bottom surface of the keycap. This cushioning layer has elasticity to achieve soundproofing and shock absorption functions.

The current shock-absorbing structures place soft materials directly under the keycap to prevent the keycap from hitting the frame. However, this approach of adding a layer of soft material directly increases the thickness of the key itself, affecting originally designed stroke and tactile feel. Therefore, the inventor is focused on finding a way to reduce keyboard vibrations while maintaining the original tactile feel.

SUMMARY OF THE INVENTION

It is one objective of the present invention to provide a keyboard, which is equipped with a buffer and noise reduction pad. When the vibration generated after hitting a key is transmitted to the buffer and noise reduction pad, the buffer and noise reduction pad is elastically deformed to counteract and absorb the vibration, thereby reducing the chance of noise generation and avoiding disturbing the user or others.

To attain the above objective, the keyboard of the present invention comprises a key frame, a support frame, a circuit board, a buffer and noise reduction pad, and a plurality of keys. The key frame has a plurality of key holes. The support frame has a plurality of support holes corresponding to the key holes, and a plurality of assembly portions provided at a top surface thereof and assembled with the key holes of the key frame. The circuit board is abutted against a bottom surface of the support frame. The buffer and noise reduction pad has a pad plate abutted against a bottom surface of the circuit board and a pad foot connected to a bottom surface of the pad plate, such that the buffer and noise reduction pad is elastically deformed when subjected to force. The keys are inserted through the key holes of the key frame and the support holes of the support frame and in contact with the circuit board.

In one embodiment of the present invention, a plurality of assembly slots are formed at a periphery of each of the key holes and assembled with the assembly portions of the support frame.

In one embodiment of the present invention, each of the support holes is surrounded by a plurality of the assembly portions of the support frame.

In one embodiment of the present invention, the circuit board further has a plurality of openings. The keys are inserted through the key holes of the key frame, the support holes of the support frame, and the openings of the circuit board, and the outer surfaces of the keys are in contact with the circuit board.

In one embodiment of the present invention, the pad foot of the buffer and noise reduction pad has two connecting plates each have one end connected to the bottom surface of the pad plate.

In one embodiment of the present invention, the one ends of the connecting plates are connected to two ends of the bottom surface of the pad plate, respectively. In one embodiment of the present invention, each of the connecting plates is L-shaped and vertically connected to two ends of the bottom surface of the pad plate.

In one embodiment of the present invention, the one ends of the connecting plates are jointly connected to a center of the bottom surface of the pad plate.

In one embodiment of the present invention, the left and right ends of the pad plate are bent upward relative to a horizontal axis, and the left and right ends of the pad foot are bent downward relative to the horizontal axis.

In one embodiment of the present invention, two end edges of the pad plate are inwardly recessed to respectively form a first notch, and two side edges of the pad plate are inwardly recessed to respectively form a second notch.

In one embodiment of the present invention, the pad plate has a plurality of first through holes passing through top and bottom surfaces of the pad plate.

In one embodiment of the present invention, the pad foot has a plurality of second through holes passing through top and bottom surfaces of the pad foot.

In one embodiment of the present invention, a plurality of buffer members are porous hollow structures arranged on a top surface of the key frame and arranged on a bottom surface of the circuit board.

In one embodiment of the present invention, each of the buffer members has a central circular hole and a plurality of sector holes formed on an outer periphery of the central circular hole. The central circular hole and the sector holes passes through both ends of the buffer member.

Other advantages and features of the present invention will be fully understood by reference to the following specification in conjunction with the accompanying drawings, in which like reference signs denote like components of structure.

DETAILED DESCRIPTION OF THE INVENTION

Figure 1:
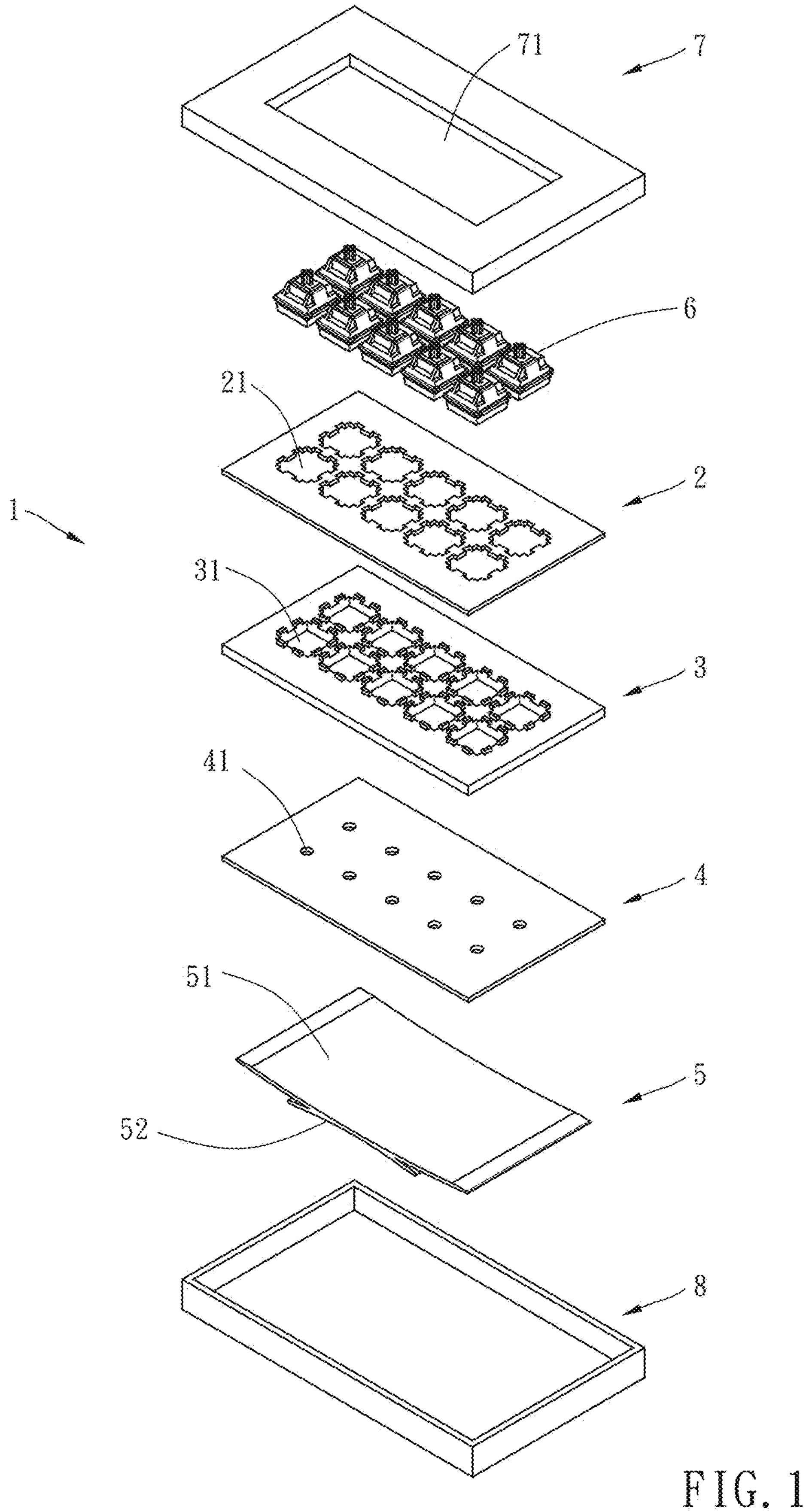
FIG. 1 is an exploded view of a keyboard of the present invention.
Figure 2:
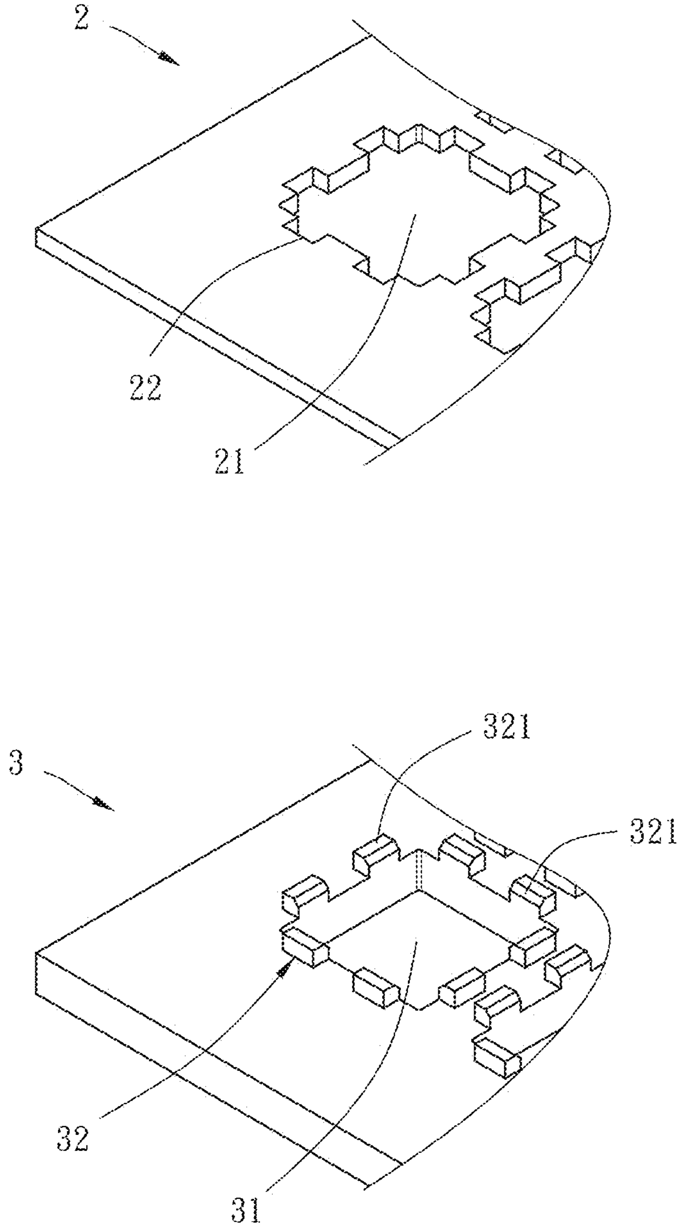
FIG. 2 is an enlarged view of the key frame and the support frame provided by the keyboard of the present invention.
Figure 3:
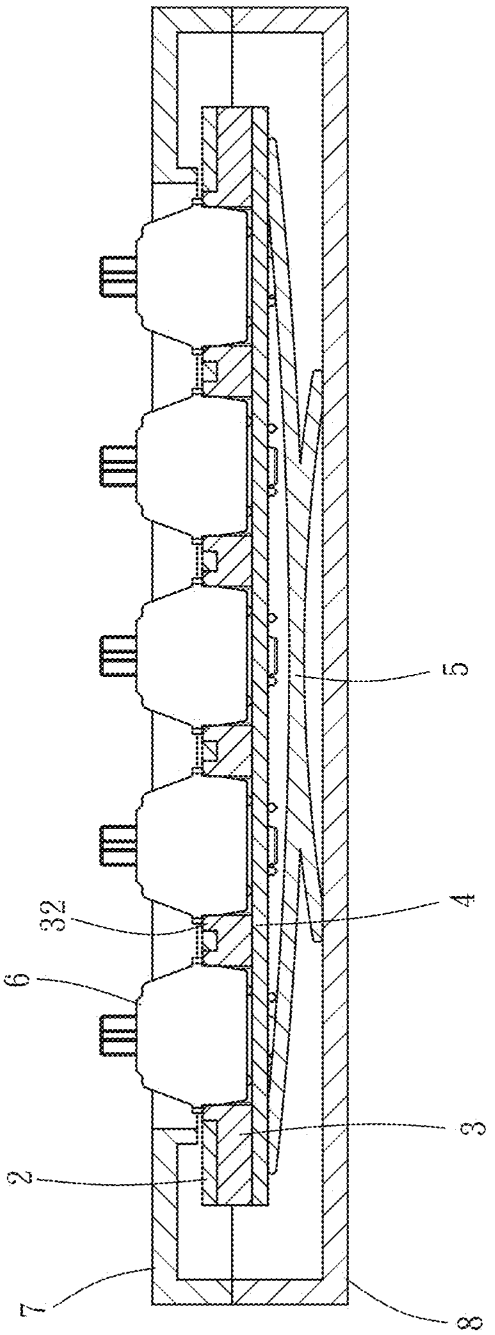
FIG. 3 is a sectional view of the keyboard of the present invention.
Figure 4:
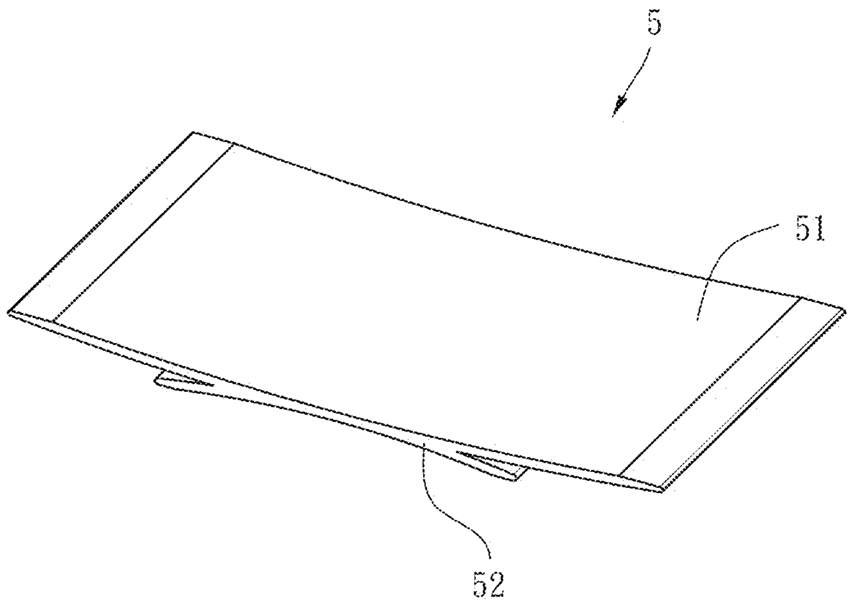
FIG. 4 is a top perspective view of the first buffer and noise reduction pad provided by the keyboard of the present invention.
Figure 5:
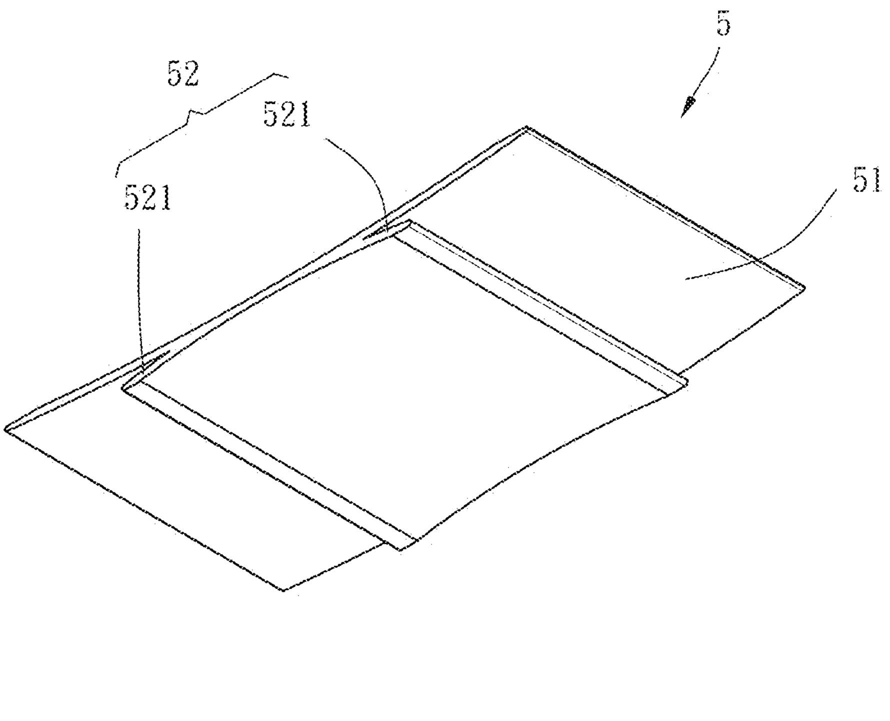
FIG. 5 is a bottom view of the first buffer and noise reduction pad provided by the keyboard of the present invention.
Figure 6:
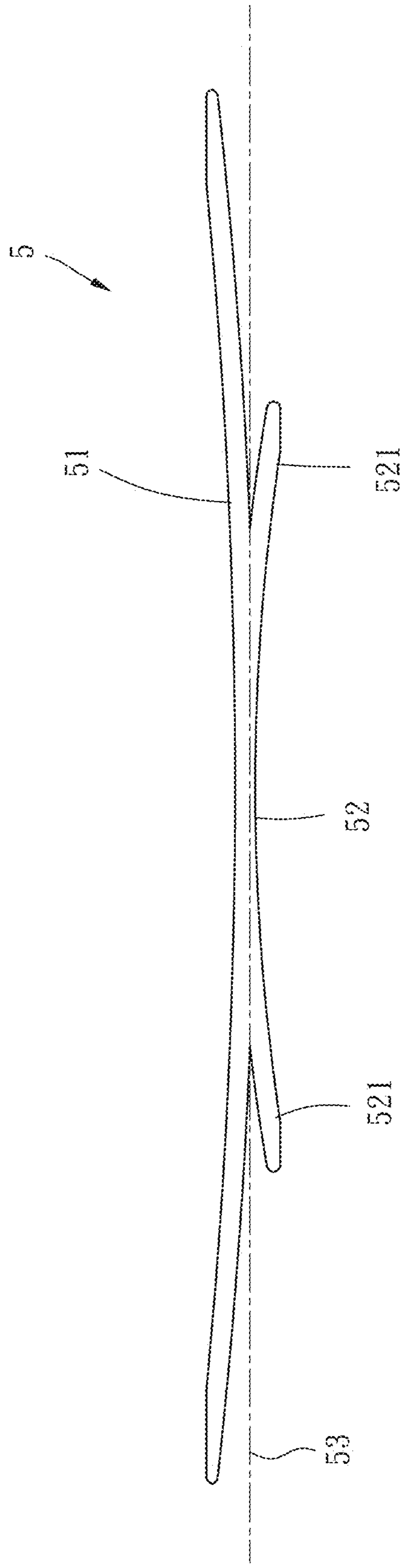
FIG. 6 is a lateral view of the first buffer and noise reduction pad provided by the keyboard of the present invention.

Referring to FIGS. 1-3, a keyboard 1 of the present invention comprises a key frame 2, a support frame 3, a circuit board 4, a buffer and noise reduction pad 5, and a plurality of keys 6.

The key frame 2 includes a plurality of key holes 21. The key holes 21 pass through the top and bottom surfaces of the key frame 2. Each key hole 21 is provided with two assembly slots 22 on each side. That is, each of the key holes 21 is surrounded by eight assembly slots 22.

The support frame 3 includes a plurality of support holes 31 and a plurality of assembly portions 32. The support holes 31 pass through the top and bottom surfaces of the support frame 3, and the number of the support hole 31 corresponds to the number of the key hole 21 of the key frame 2. Further, the assembly portion 32 is formed by a plurality of protrusions 321 protruding from the top surface of the support frame 3 and located at the periphery of the support hole 31. The assembly portions 32 of the support frame 3 are assembled with the assembly slots 22 of the key frame 2, and the support holes 31 of the support frame 3 communicate with the key holes 21 of the key frame 2. In this embodiment, eight assembly slots 22 are arranged on the periphery of each of the key holes 21, so that the assembly portion 32 is also provided with eight protrusions 321 on the periphery of each of the support holes 31. The protrusions 321 are engaged with the assembly slots 22.

The circuit board 4 is abutted against the bottom surface of the support frame 3 and provided with a plurality of openings 41. The openings 41 pass through the top and bottom surface of the circuit board 4.

FIGS. 4 to 13 show different embodiments of the buffer and noise reduction pad 5. The buffer and noise reduction pad 5 is an integrally formed structure, which has a pad plate 51 abutted against the bottom surface of the circuit board 4 and a pad foot 52 connected to the bottom surface of the pad plate 51. The pad plate 51 can be provided with a plurality of first through holes 511. The pad foot 52 has two connecting plates 521, and the pad foot 52 can be provided with a plurality of second through holes 522.

One ends of the two connecting plates 521 of the pad foot 52 can be jointly connected to the center of the bottom surface of the pad plate 51. The left and right ends of the pad plate 51 are bent upward relative to a horizontal axis 53, so that the top surfaces of the left and right ends of the pad plate 51 is abutted against the bottom surface pf the circuit board 4. The left and right ends of the pad foot 52 are bent downward relative to the horizontal axis 53. That is, the end of the connecting plate 521 that is not connected to the pad plate 51 is bent downward, which means that the pad plate 51 and the pad foot 52 are symmetrical to the horizontal axis 53, as shown in FIGS. 4 to 6 and FIGS. 9 to 12.

Figure 7:
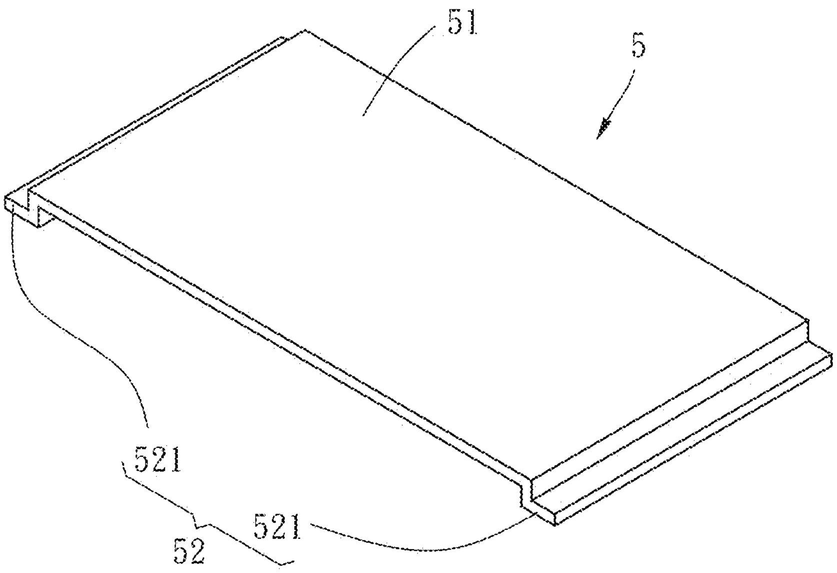
FIG. 7 is a top perspective view of the second buffer and noise reduction pad provided by the keyboard of the present invention.
Figure 8:
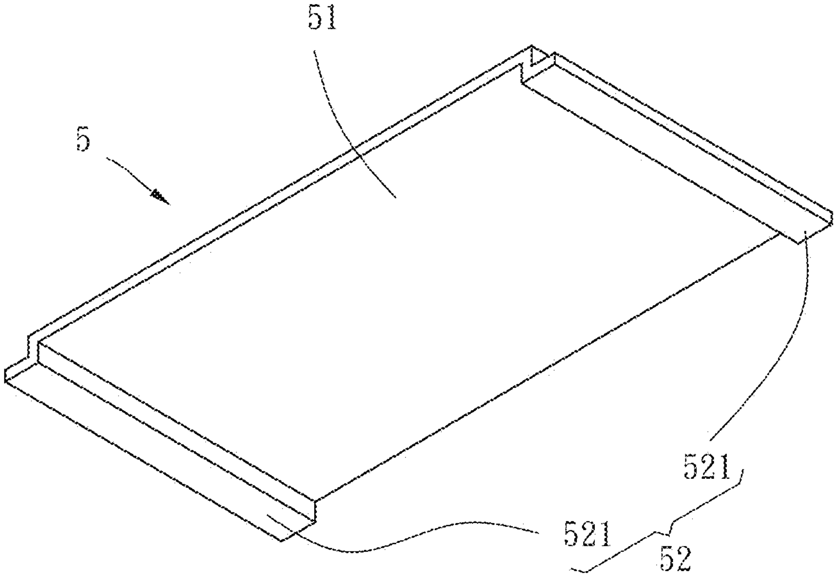
FIG. 8 is a bottom view of the second buffer and noise reduction pad provided by the keyboard of the present invention.
Figure 9:
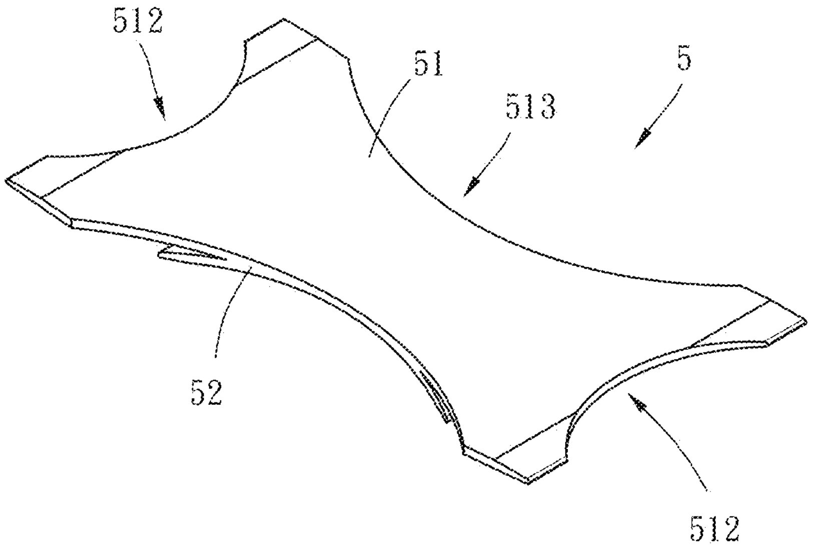
FIG. 9 is a top perspective view of the third buffer and noise reduction pad provided by the keyboard of the present invention.
Figure 10:
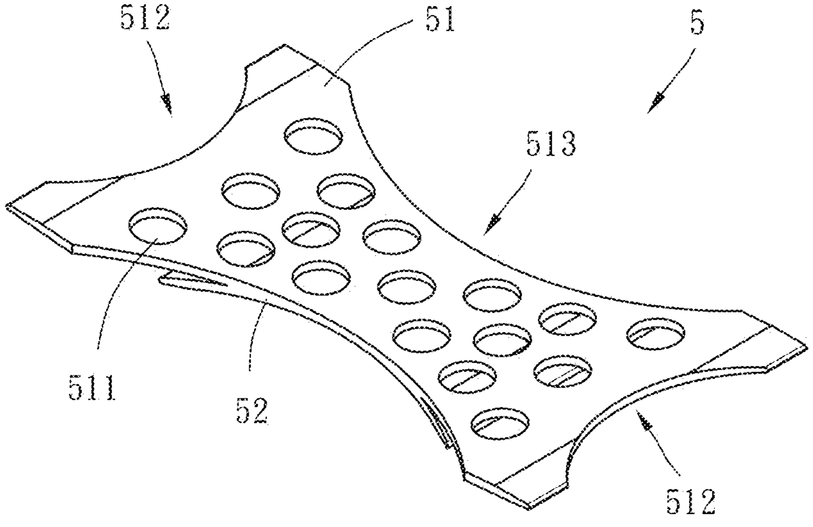
FIG. 10 is a top perspective view of the fourth buffer and noise reduction pad provided by the keyboard of the present invention.
Figure 11:
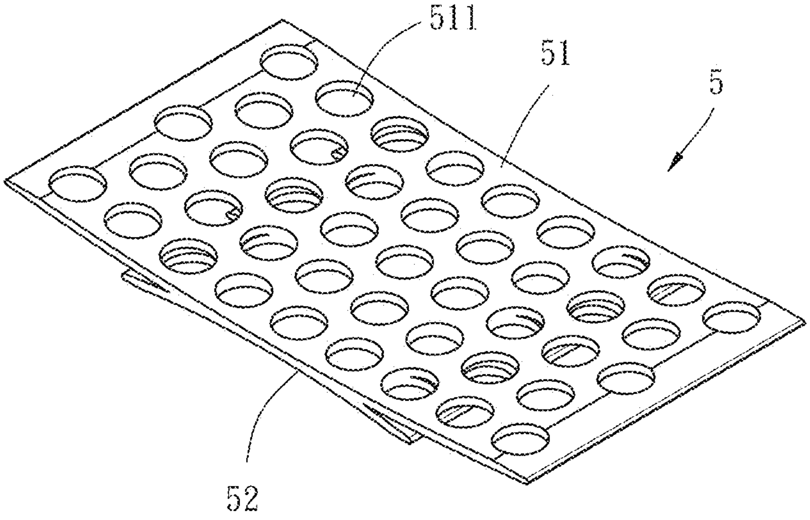
FIG. 11 is a top perspective view of the fifth buffer and noise reduction pad provided by the keyboard of the present invention.
Figure 12:
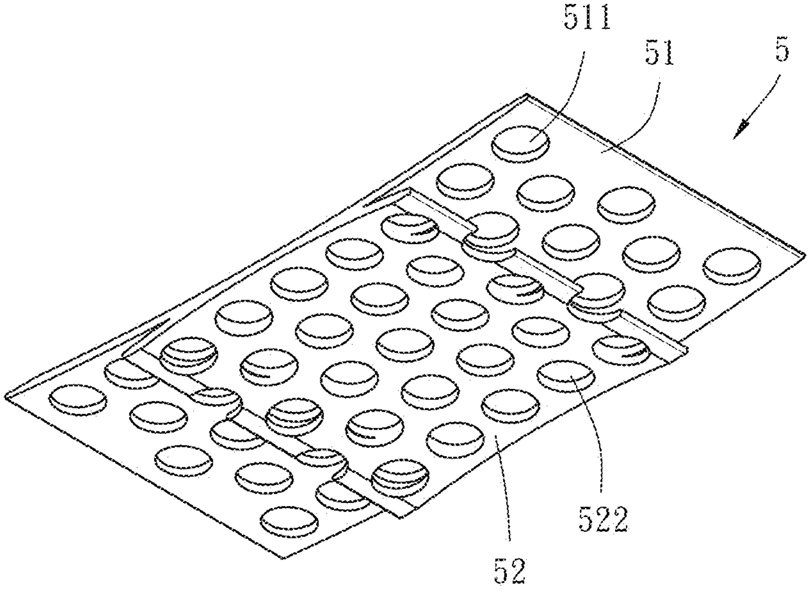
FIG. 12 is a bottom perspective view of the fifth buffer and noise reduction pad provided by the keyboard of the present invention.
Figure 13:
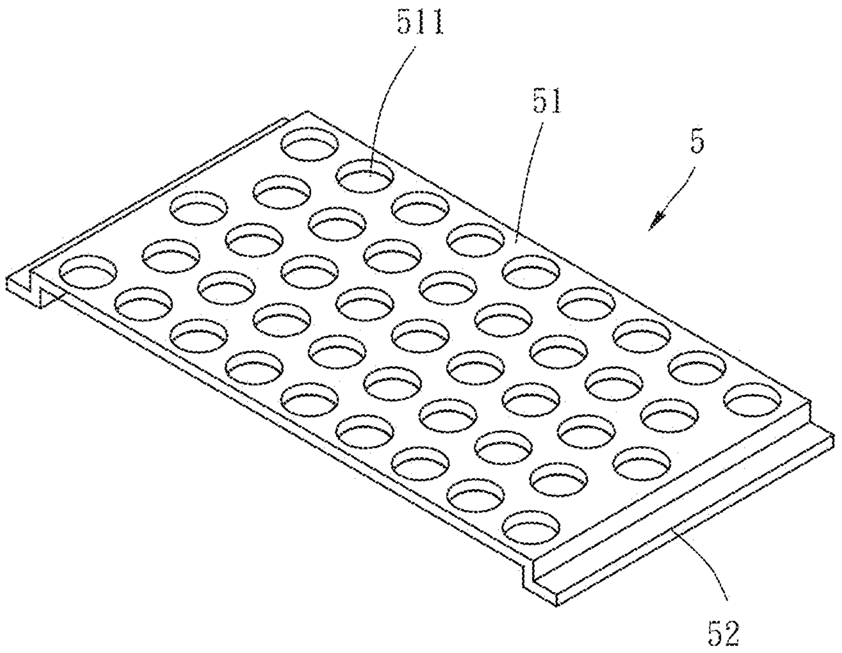
FIG. 13 is a top perspective view of the sixth buffer and noise reduction pad provided by the keyboard of the present invention.

The two connecting plates 521 of the pad foot 52 can be connected to two ends of the bottom surface of the pad plate 51, respectively. That is, two symmetrical L-shaped connecting plates 521 are connected perpendicularly to the left and right ends of the pad plate 51, such that the entire top surface of the pad plate 51 is abutted against the bottom surface of the circuit board 4, as shown in FIGS. 7, 8, and 13.

The structure of the pad plate 51 and the pad foot 52 allows the buffer and noise reduction pad 5 to be elastic. When an external force is applied, the buffer and noise reduction pad 5 can undergo slight deformation to counteract the external force.

The buffer and noise reduction pad 5 of the present invention can be categorized into six forms based on the connection form between the pad foot 52 and the pad plate 51, as well as the configuration of the through holes. The structural features of each type are described as follows.

First form: Please refer to FIGS. 4 to 6, the two connecting plates 521 of the pad foot 52 of the buffer and noise reduction pad 5 are jointly connected to the center of the bottom surface of the pad plate 51.

Second form: Please refer to FIGS. 7 and 8, the two connecting plates 521 of the pad foot 52 of the buffer and noise reduction pad 5 are connected to the two ends of the bottom surface of the pad plate 51, respectively.

Third form: Please refer to FIG. 9, the two connecting plates 521 of the pad foot 52 of the buffer and noise reduction pad 5 are jointly connected to the center of the bottom surface of the pad plate 51, and further, two end edges of the pad plate 51 are inwardly recessed to respectively form a first notch 512, and two side edges of the pad plate 51 are inwardly recessed to respectively form a second notch 513. The elasticity of the buffer and noise reduction pad 5 can be enhanced through the first notches 512 and the second notches 513.

Fourth form: Please refer to FIGS. 10, the two connecting plates 521 of the pad foot 52 of the buffer and noise reduction pad 5 are jointly connected to the center of the bottom surface of the pad plate 51, and further, two end edges of the pad plate 51 are inwardly recessed to respectively form a first notch 512, and two side edges of the pad plate 51 are inwardly recessed to respectively form a second notch 513. Furthermore, the pad plate 51 is provided with a plurality of first through holes 511 to increase noise reduction effect.

Fifth form: Please refer to FIGS. 11 and 12, the two connecting plates 521 of the pad foot 52 of the buffer and noise reduction pad 5 are jointly connected to the center of the bottom surface of the pad plate 51, and further, the pad plate 51 is provided with a plurality of through holes 511, and the pad foot 52 is provided with a plurality of second through holes 522. The noise reduction effect can be increased through the first through holes 511 and the second through holes 522.

Sixth from: Please refer to FIG. 13, the two connecting plates 521 of the pad foot 52 of the buffer and noise reduction pad 5 are connected to the two ends of the bottom surface of the pad plate 51, respectively, and further, the pad plate 51 is provided with a plurality of first through holes 511 to increase noise reduction effect.

The number of the key 6 corresponds to the number of the key hole 21 and the support hole 31. The key 6 is inserted in the key hole 21 of the key frame 2 and the support hole 31 of the support frame 3, and the bottom of the key 6 is in contact with the circuit board 4. When the key 6 is pressed, the internal spring (not shown) is compressed, and when the key 6 is released, the spring provides a rebound force to restore the key 6. Since the circuit board 4 has the opening 41, the bottom of the key 6 further passes through the opening 41 of the circuit board 4 to enable the outer surface of the bottom of the key 6 to be in contact with the circuit board 4.

Furthermore, the key frame 2, the support frame 3, the circuit board 4, the buffer and noise reduction frame 5, and the keys 6 are installed in a housing assembled by a top cover 7 and a bottom cover 8. A hollow opening 71 is formed at the center of the top cover 7 to expose the keys 6 for the user to press them.

When the user taps the keycap (not shown) of the key 6, the spring inside the key 6 is compressed, and the bottom edge of the keycap hits the key frame 2 and the assembly portion 32 of the support frame 3 at the same time to generate vibration. The vibration is transmitted to the circuit board 4 through the key frame 2 and the support frame 3, and then transmitted to the buffer and noise reduction pad 5 abutted against the circuit board 4.

In the case where the buffer and noise reduction pad 5 is in the first, third, fourth, and fifth forms, as shown in FIGS. 4 to 6 and 9 to 12, when the vibration from typing on the keyboard 1 is transmitted to the circuit board 4, the buffer and noise reduction pad 5 receives the vibration through the top surfaces of the left and right ends of the pad plate 51, which act as the force-bearing surfaces. The vibration is then transmitted to the pad foot 52 through the junction between the pad plate 51 and the pad foot 52. At this time, the pad plate 51 and the pad foot 52 undergo slight deformation due to the external force, causing two ends of the pad plate 51 and two ends of the pad foot 52 to move slightly closer together.

In the case where the buffer and noise reduction pad 5 is in the second and sixth forms, as shown in FIGS. 7, 8, and 13, when the vibration from typing on the keyboard 1 is transmitted to the circuit board 4, the buffer and noise reduction pad 5 receives the vibration through the entire top surface of the pad plate 51, which act as the force-bearing surfaces. The vibration is then transmitted to the pad foot 52 through the junction between the pad plate 51 and the pad foot 52. At this time, the pad plate 51 and the pad foot 52 undergo slight deformation due to the external force, causing the center of the pad plate 51 to slightly depress.

Thus, through the pad plate 51 and the pad foot 52, the buffer and noise reduction pad 5 can counteract and absorb the vibrations to prevent noise generation. This ensures that the user is not disturbed by the noise from typing on the keyboard 1 while maintaining good tactile feedback from pressing the keys 6.

Moreover, the first through holes 511 formed in the pad plate 51 and the second through holes 522 formed in the pad foot 52 can directly achieve noise reduction. When noise is generated, the sound waves are transmitted through the key frame 2 and the support frame 3 to the openings 41 of the circuit board 4. The sound waves are reflected by the inner peripheral surface of the openings 41, so that the intensity of the sound waves is reduced. Sound wave is a type of longitudinal wave that can be attenuated through diffusion and absorption during transmission. In the present invention, the openings 41 of the circuit board 4, the first through holes 511 of the pad plate 51, and the second through holes 522 of the pad foot 52 all allow the sound waves of the noise to undergo multiple reflections, which can also be considered as multiple diffusions. With each reflection, the sound waves are attenuated due to absorption or diffusion in the keyboard 1. In this way, the sound waves of the noise are repeatedly reflected and absorbed, so that the sound waves of the noise can be greatly attenuated, making the noise difficult to be transmitted to the outside of the keyboard 1.

In addition, the support frame 3 provided between the key frame 2 and the circuit board 4 can also provide a buffer effect. The key 6 is surrounded by the assembly portions 32 of the support frame 3, as shown in FIG. 3, so that before transmitted to the circuit board 4, the vibration needs to pass through the support frame 3 first. The support frame 3, which is thicker than the key frame 2 and the circuit board 4, can absorb the vibration of the keys 6 hitting the key frame 2 and absorb part of the sound waves.

Figure 14:
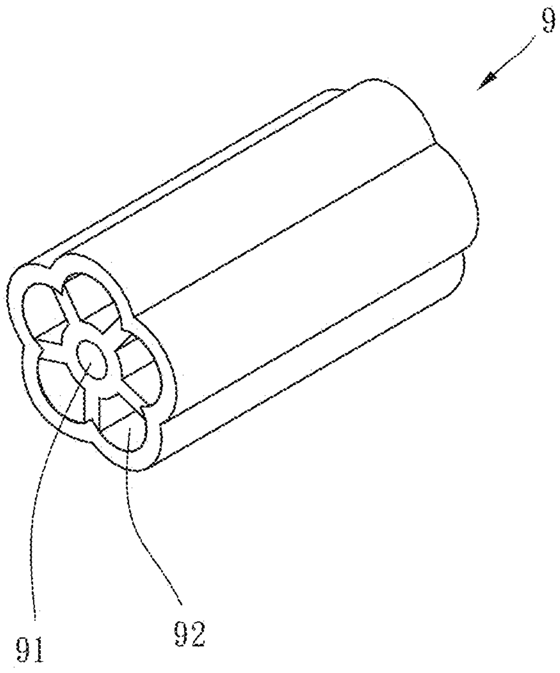
FIG. 14 is a perspective view of the buffer member provided by the keyboard of the present invention.

Furthermore, in this embodiment, a plurality of buffer members 9 can be arranged between the top surface of the key frame 2 and the bottom surface of the top cover 7, and arranged between the bottom surface of the circuit board 4 and the top surface of the pad plate 51 of the buffer and noise reduction pad 5. The buffer member 9 is made of soft materials and forms a porous hollow structure with a central circular hole 91 and a plurality of sector holes 92 arranged on the outer periphery of the central circular hole 91. The central circular hole 91 and the sector holes 92 pass through both ends of the buffer member 9. As shown in FIG. 14, this porous hollow structure can increase the elasticity of the buffer member 9. When the key 6 is struck, the vibration is transmitted through the key frame 2 to the buffer member 9 provided on the top surface of the key frame 2 and the support frame 3, and the vibration is then transmitted through the support frame 3 to the buffer member 9 provided on the bottom surface of the circuit board 4. The vibration can be weakened through the porous hollow structure and elasticity of the buffer member 9.

Figure 15:
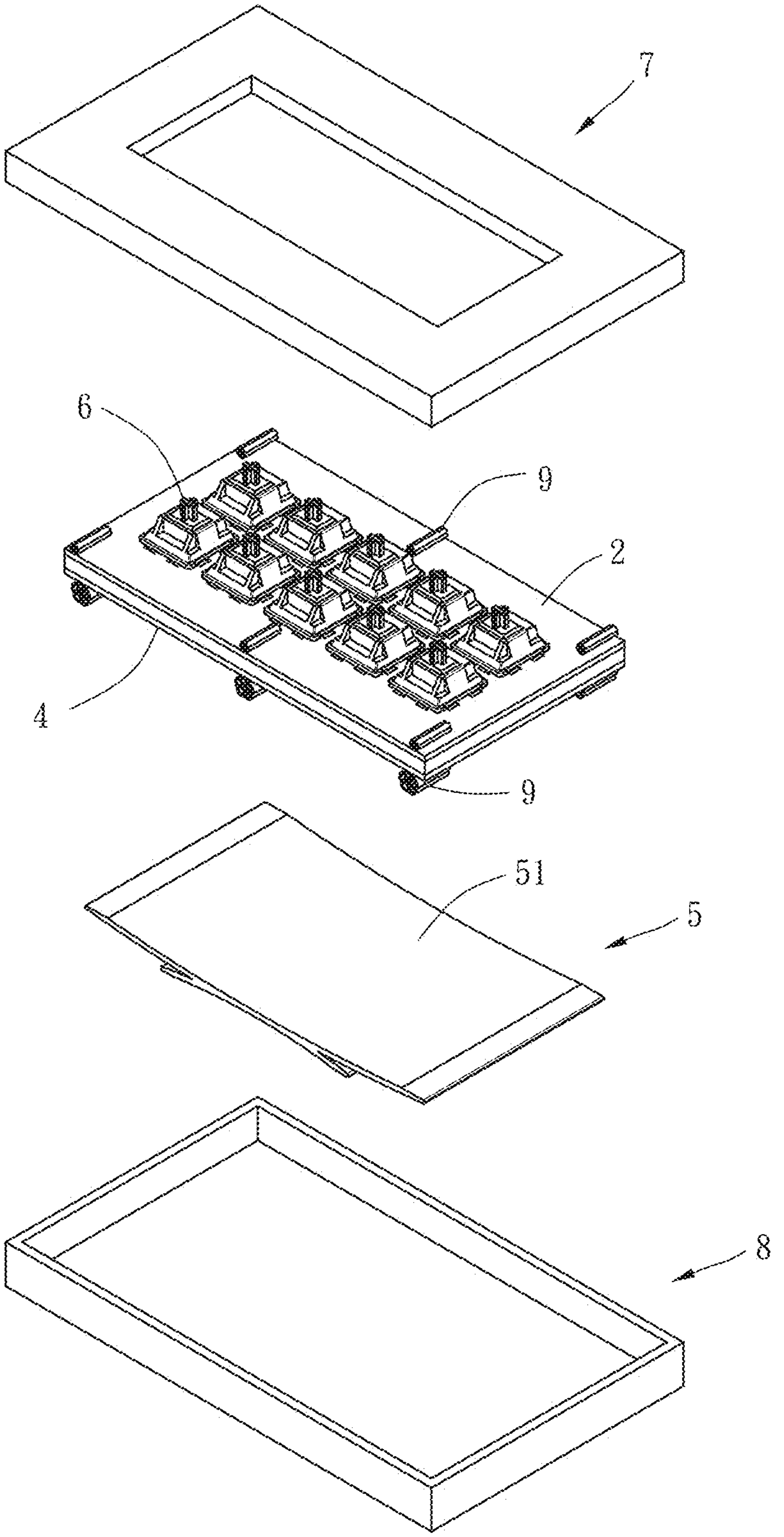
FIG. 15 is an exploded view of the keyboard of the present invention, showing the arrangement of the buffer member.

The buffer member 9 may, for example, be configured in different sizes. A small-size buffer member 9 is provided between the key frame 2 and the top cover 7, and a large-size buffer member 9 is provided between the circuit board 4 and the buffer and noise reduction pad 5. FIG. 15 shows that this configuration can achieve better buffering capacity and maintain good tactile feedback of the keyboard 1.

Based on the above implementation description, it can be seen that compared to the prior art, the present invention has the following advantages:

1. The pad plate 51 and the pad foot 52 allow the buffer and noise reduction pad 5 to have elasticity. When the keyboard 1 is struck, the vibration generated by striking the keyboard 1 is counteracted and absorbed by the buffer and noise reduction pad 5. This configuration suppresses vibrations and prevents the noise that would otherwise result from these vibrations, achieving both cushioning and noise reduction effects.
2. The keyboard 1 of the present invention is provided with the support frame 3 between the key frame 2 and the circuit board 4. The noise and vibration generated by striking the keyboard 1 are transmitted to the support frame 3, which can absorb both the noise and vibration. Therefore, it serves the dual function of shock absorption and noise reduction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A keyboard comprising:

a key frame having a plurality of key holes;

a support frame having a plurality of support holes corresponding to the key holes, and a plurality of assembly portions provided at a top surface thereof and assembled with the key holes of the key frame;

a circuit board abutted against a bottom surface of the support frame;

a buffer and noise reduction pad having a pad plate abutted against a bottom surface of the circuit board and a pad foot connected to a bottom surface of the pad plate, such that the buffer and noise reduction pad is elastically deformed when subjected to force; and a plurality of keys inserted through the key holes of the key frame and the support holes of the support frame and contacting the circuit board.

2. The keyboard as claimed in claim 1, wherein a plurality of assembly slots are formed at a periphery of each of the key holes and assembled with the assembly portions of the support frame.

3. The keyboard as claimed in claim 1, wherein each of the support holes is surrounded by the plurality of the assembly portions of the support frame.

4. The keyboard as claimed in claim 1, wherein the circuit board further has a plurality of openings; the keys are inserted through the key holes of the key frame, the support holes of the support frame, and the openings of the circuit board, and outer surfaces of the keys are in contact with the circuit board.

5. The keyboard as claimed in claim 1, wherein the pad foot of the buffer and noise reduction pad has two connecting plates each have one end connected to the bottom surface of the pad plate.

6. The keyboard as claimed in claim 5, wherein the one ends of the connecting plates are connected to two ends of the bottom surface of the pad plate, respectively.

7. The keyboard as claimed in claim 6, wherein each of the connecting plates is L-shaped and vertically connected to the two ends of the bottom surface of the pad plate.

8. The keyboard as claimed in claim 5, wherein the one ends of the connecting plates are jointly connected to a center of the bottom surface of the pad plate.

9. The keyboard as claimed in claim 8, wherein left and right ends of the pad plate are bent upward relative to a horizontal axis, and left and right ends of the pad foot are bent downward relative to the horizontal axis.

10. The keyboard as claimed in claim 9, wherein two end edges of the pad plate are inwardly recessed to respectively form a first notch, and two side edges of the pad plate are inwardly recessed to respectively form a second notch.

11. The keyboard as claimed in claim 1, wherein the pad plate has a plurality of first through holes passing through top and bottom surfaces of the pad plate.

12. The keyboard as claimed in claim 1, wherein the pad foot has a plurality of second through holes passing through top and bottom surfaces of the pad foot.

13. The keyboard as claimed in claim 1, further comprising a plurality of buffer members that are porous hollow structures arranged on a top surface of the key frame and arranged on a bottom surface of the circuit board.

14. The keyboard as claimed in claim 13, wherein each of the buffer members has a central circular hole and a plurality of sector holes formed on an outer periphery of the central circular hole; the central circular hole and the sector holes passes through both ends of the buffer member.

* * * * *